United States Patent
Walker et al.

(10) Patent No.: US 6,597,776 B1
(45) Date of Patent: *Jul. 22, 2003

(54) METHOD AND SYSTEM FOR ALLOWING EXTENDED CONNECTIONS TO CONTENT PROVIDERS VIA PREPAID CONTENT PROVIDER ACCOUNTS

(75) Inventors: Jay S. Walker, Ridgefield, CT (US); James A. Jorasch, Stamford, CT (US); John M. Packes, Jr., Stamford, CT (US); Robert R. Lech, Dublin, OH (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/224,483

(22) Filed: Dec. 31, 1998

Related U.S. Application Data (63) Continuation-in-part of application No. 09/148,272, filed on Sep. 4, 1998, which is a continuation of application No. 08/570,443, filed on Dec. 11, 1995, now Pat. No. 5,825,863, application No. 09/224,483, which is a continuation-in-part of application No. 08/777,802, filed on Dec. 31, 1996, now Pat. No. 6,246,755.

(51) Int. Cl.[7] ............................................. H04M 15/00
(52) U.S. Cl. ............................ 379/114.26; 379/114.25; 379/127.01; 379/201.01
(58) Field of Search ............................ 379/67.1, 88–89, 379/111–115.01, 120–121, 133–134, 201.01, 216.01, 355.1–356.01, 358–359, 188–189, 196–197, 199–200

(56) References Cited

U.S. PATENT DOCUMENTS 5,153,907 A  10/1992  Pugh et al.
5,418,844 A   5/1995  Morrisey et al.
5,544,320 A   8/1996  Konrad ................. 395/200.09

(List continued on next page.)

FOREIGN PATENT DOCUMENTS

GB  2 171 877 A   9/1986
JP  61-210754     9/1986

(List continued on next page.)

OTHER PUBLICATIONS

Staff Information, "Important Information About 0055 And The New 0051 Service", Telstra, Sep. 1991.
Copy of "IEEE Communications Magazine", Mar. 1993, vol. 31, No. 3.

(List continued on next page.)

*Primary Examiner*—Duc Nguyen
(74) *Attorney, Agent, or Firm*—Michael D. Downs (57) ABSTRACT

A method and system for connecting a caller to a content provider who provides a service to the caller over the telephone system is disclosed. In accordance with the invention, a transaction processor (i.e., debit card platform) is disclosed which generally receives a telephone call from a caller identifying (a) a first account identifier corresponding to a balance of a first account, the balance of the first account being associated with an amount of available funds, and (b) a content provider identifier corresponding to a telephone number of the content provider. The debit card platform establishes a telephone connection between the caller and the content provider to enable the content provider to provide a service to the caller through the telephone connection. During the course of the connection, the debit card platform continuously monitors the caller's amount of available funds in the first account and, upon occurrence of a "triggering event," performs an action to increase the amount of available funds. The triggering event may be, e.g., the receipt of the telephone call, providing the caller with the cost of the service, the amount of available funds reaching a threshold value, or the expiration of a period of time. When the transaction is completed, the debit card platform debits the first account by a transaction amount based on the content provider and the service provided.

34 Claims, 10 Drawing Sheets

300

| | ACCOUNT IDENTIFIER 310 | ACCOUNT BALANCE 320 | ACTIVATION DATE 330 | EXPIRATION DATE 340 | TOTAL AMOUNT SPENT TO DATE 350 | PRIMARY ACCOUNT 360 |
|---|---|---|---|---|---|---|
| 365 | | | | | | |
| 370 | 111-222-333 | $21.50 | 06/96 | 2/00 | $138.50 | 111-222-333 |
| 375 | 222-333-444 | $50.00 | -- | 01/02 | $0.00 | -- |
| 380 | 333-444-555 | $10.50 | 01/98 | 05/01 | $10.50 | -- |
| | 444-555-666 | -- | 08/97 | 08/02 | -- | 111-222-333 |

U.S. PATENT DOCUMENTS

| | | |
|---|---|---|
| 5,570,417 A | 10/1996 | Byers |
| 5,590,181 A * | 12/1996 | Hogan et al. |
| 5,715,298 A | 2/1998 | Rogers |
| 5,802,156 A | 9/1998 | Felger ........................ 379/112 |
| 5,845,260 A | 12/1998 | Nakano et al. |
| 6,188,752 B1 | 2/2001 | Lesley ........................ 379/114 |
| 6,246,755 B1 | 6/2001 | Walker et al. |
| 6,385,592 B1 | 5/2002 | Angles et al. ................ 705/14 |

FOREIGN PATENT DOCUMENTS

| | | |
|---|---|---|
| JP | 7030692 | 1/1995 |
| JP | 7250165 | 9/1995 |
| JP | 8-214281 | 8/1996 |

OTHER PUBLICATIONS

Harju, Jarmo et al., "Intelligent Networks", Chapman & Hall, 1994, pp. 1–33 and chapters 4, 12 and 13.

"ITU–T Recommendation Q.1219, Intelligent Network User's Guide For Capability Set 1", International Telecommunication Union, Apr. 1994.

Copy of "BT Technology Journal", Apr. 1995, vol. 13.

Magendanz, Thomas et al., "Intelligent Networks", International Thomson Computer Press, 1996, pp. 1–93, 169–216.

Sealey, Brett "Prepaid Disposable Card Requirements Specification Document", Telstra Corporation Ltd., Oct. 24, 1996, pp. 1–72.

Lim, Chris, "InfoCall Requirements Specification Document", Telstra Corporation Ltd., Nov. 8, 1996, pp. 1–105.

* cited by examiner

| ACCOUNT IDENTIFIER 310 | ACCOUNT BALANCE 320 | ACTIVATION DATE 330 | EXPIRATION DATE 340 | TOTAL AMOUNT SPENT TO DATE 350 | PRIMARY ACCOUNT 360 |
|---|---|---|---|---|---|
| 111-222-333 | $21.50 | 06/96 | 2/00 | $138.50 | 111-222-333 |
| 222-333-444 | $50.00 | -- | 01/02 | $0.00 | -- |
| 333-444-555 | $10.50 | 01/98 | 05/01 | $10.50 | -- |
| 444-555-666 | -- | 08/97 | 08/02 | -- | 111-222-333 |

| CONTENT PROVIDER NAME 410 | CONTENT PROVIDER IDENTIFIER 420 | COST SCHEDULE 430 |
|---|---|---|
| JOE GREEN'S GARDENING TIPS | 900-222-3333 | $2.00 / MINUTE |
| MAMA'S FAVORITE RECIPIES | 900-432-8765 | $5.00 / CALL |
| GUITAR-GURU MAGAZINE'S DIAL-A-RIFF | 900-251-1625 | $1.50 / MINUTE |
| PRICE WATCHER'S SHOPPING SECRETS | 900-888-7576 | $2.00 / CALL |

400

435 → (row 1)
440 → (row 2)
445 → (row 3)
450 → (row 4)

FIG. 4

| ACCOUNT IDENTIFIER 510 | AMOUNT OF CREDIT ISSUED 520 | DATE CREDIT ISSUED 530 | CALLER PHONE NUMBER 540 |
|---|---|---|---|
| 111-222-333 | $6.75 | 05/21/97 | (201) 333-4444 |
| 765-654-543 | $15.00 | 11/18/98 | (414) 888-6677 |
| 098-987-876 | $9.50 | 07/22/98 | (203) 978-9678 |
| 456-567-456 | $21.00 | 10/31/97 | (996) 345-4567 |

METHOD AND SYSTEM FOR ALLOWING EXTENDED CONNECTIONS TO CONTENT PROVIDERS VIA PREPAID CONTENT PROVIDER ACCOUNTS

CROSS-REFERENCE TO RELATED APPLICATIONS

This application is a continuation-in-part of:

(i) U.S. patent application Ser. No. 08/777,802 filed Dec. 31, 1996 and issued Jun. 12, 2001 as U.S. Pat. No. 6,246,755; and also (ii) U.S. patent application Ser. No. 09/148,272 filed Sep. 4, 1998, which is a continuation of U.S. patent application Ser. No. 08/570,443 filed Dec. 11, 1995 and issued Oct. 20, 1998 as U.S. Pat. No. 5,825,863.

FIELD OF THE INVENTION

This invention relates generally to a system and method for allowing a caller to access a service offered by a content provider over a telephone network via an intermediary and, more particularly, to a system and method for allowing a caller to extend his connection to the content provider by increasing the balance of a prepaid account associated with the caller.

BACKGROUND OF THE INVENTION

With the advent of 900 number and similar shared-revenue systems, the use of telephone-based services and the corresponding number of providers of these services has increased dramatically. Consumers can now use the telephone to receive a wide variety of services, ranging from technical support to personal psychic readings. These services are typically provided by a content provider who first delivers the service over the telephone and subsequently bills a caller. The caller typically is identified by the phone number from which he is calling, and the subsequent bill is then included as part of the caller's telephone bill. The content provider typically calculates the amount of the bill after the service has been delivered. This amount is forwarded to the telephone company, which both bills and collects from the caller. The telephone company typically deducts a portion of the total payment in return for both the cost of making the telephone connection and for the telephone company's role as bill collector.

This system has significant drawbacks. For example, because the caller is charged after he has consumed the service, there is a significant risk of bad debt. Callers may refuse to pay for the service or may even deny having used the service in the first place. This generally results in a loss to the content provider and also requires the telephone company to charge a higher rate for the telephone connection because a fraction of the connections will be written off as bad debt. Another disadvantage is that calls from public access phones, such as those in airports and hotels, are typically blocked because it is unclear who should be billed for calls from these phones. Many companies also block calls from their internal phones to prevent employees from, among other reasons, generating large bills. Another disadvantage is that callers from home cannot access a service anonymously because telephone billing statements normally identify both the content provider called and the amount charged.

In an effort to overcome some of these disadvantages, some content providers have established 900 number debit cards in which the caller pre-pays for the service provided by the content provider. For example, a 900 number debit card was offered by the Weather Channel. In this system, the caller set up an account by purchasing the debit card, effectively prepaying for Weather Channel access/information. The caller then dialed the access number listed on the back of the debit card to access the Weather Channel, with the appropriate fee being deducted from the value remaining in the caller's prepaid account. However, the Weather Channel debit card could only complete calls to the Weather Channel; services from other content providers were not available through the Weather Channel debit card. This single service limitation severely limits the functionality of a debit card, as a caller would have to carry a separate card and maintain a separate prepaid account for each content provider he intends to access.

When a debit card's value is diminished, a caller is typically disconnected from the content provider. Being disconnected from a content provider is inconvenient in that a caller must not only call the content provider back, but will usually incur the high first-minute rates associated with many content providers. While some debit cards allow a caller to transfer funds from a credit card to a debit card account, many callers are reluctant to use a credit card account for such purposes. Callers typically purchase prepaid cards specifically to avoid inconveniences associated with credit cards such as interest, potential security risks, and the loss of anonymity.

To overcome such shortcomings, the aforementioned parent application, Ser. No. 08/777,802 entitled "Method and System for Connecting a Caller to a Content Provider," discloses a method and system for connecting a caller to a content provider that provides a service over a telephone network. In this system, the caller initially establishes a prepaid account with an intermediary, such as a "transaction processor". The transaction processor provides the caller with access to a plurality of content providers via a common access number and receives payment for the charges associated with calls to the content providers by debiting the caller's prepaid account.

One advantage of this system is that it allows a caller to anonymously access a plurality of content providers through one account. However, it does not address how a caller can increase the funds of his prepaid account without jeopardizing his anonymity. For example, the transfer of funds from the caller's credit card account to his prepaid account cannot be readily accomplished without the caller identifying himself. Accordingly, the amount of services the caller can consume is limited by the amount in the caller's prepaid account, which effectively limits the content providers' potential revenue.

Thus, a need exists for a system and method that allows a caller to anonymously increase the balance of his prepaid account and that further allows a caller to maintain an anonymous connection to the described content provider despite having a low prepaid account balance. There further exists a need for a system and method that allows the caller to switch between content providers while maintaining a connection to the transaction processor.

SUMMARY OF THE INVENTION

In connection with the foregoing, a transaction processor (e.g., debit card platform) is disclosed which generally receives a telephone call from a caller identifying (a) a first account identifier corresponding to a balance of a first account, the balance of the first account being associated with an amount of available funds, and (b) a content provider identifier corresponding to a telephone number of the content provider. The debit card platform establishes a telephone connection between the caller and the content provider to enable the content provider to provide a service to the caller through the telephone connection.

During the course of the connection, the debit card platform continuously monitors the caller's amount of available funds in the first account and, upon occurrence of a "triggering event," performs an action to increase the amount of available funds. The triggering event may be, e.g., the receipt of the telephone call, providing the caller with the cost of the service, the amount of available funds reaching a threshold value, or the expiration of a period of time.

When the transaction is completed, the debit card platform debits the first account by a transaction amount based on the content provider and the service provided.

According to one aspect of the invention, the debit card platform receives a second account identifier from the caller corresponding to a balance of a second account, and links the second account with the first account.

According to another aspect of the invention, the debit card platform establishes a connection between the caller and a second content provider upon receipt of a second content provider identifier corresponding to the second content provider.

According to another aspect of the invention, the debit card platform extends a determined amount of eligible credit to the caller's first account, and allows the caller to repay the extended credit anonymously.

According to yet another aspect of the invention, the debit card platform provides the caller with a code associated with an unlisted phone number of a content provider that allows the caller free service from the content provider for a predetermined period of time.

The system and method of the invention will be more readily understood and apparent from the following detailed description of the invention when read in conjunction with the accompanying drawings, and from the claims which are appended at the end of the detailed description.

DETAILED DESCRIPTION OF INVENTION

System Overview

Figure 1:
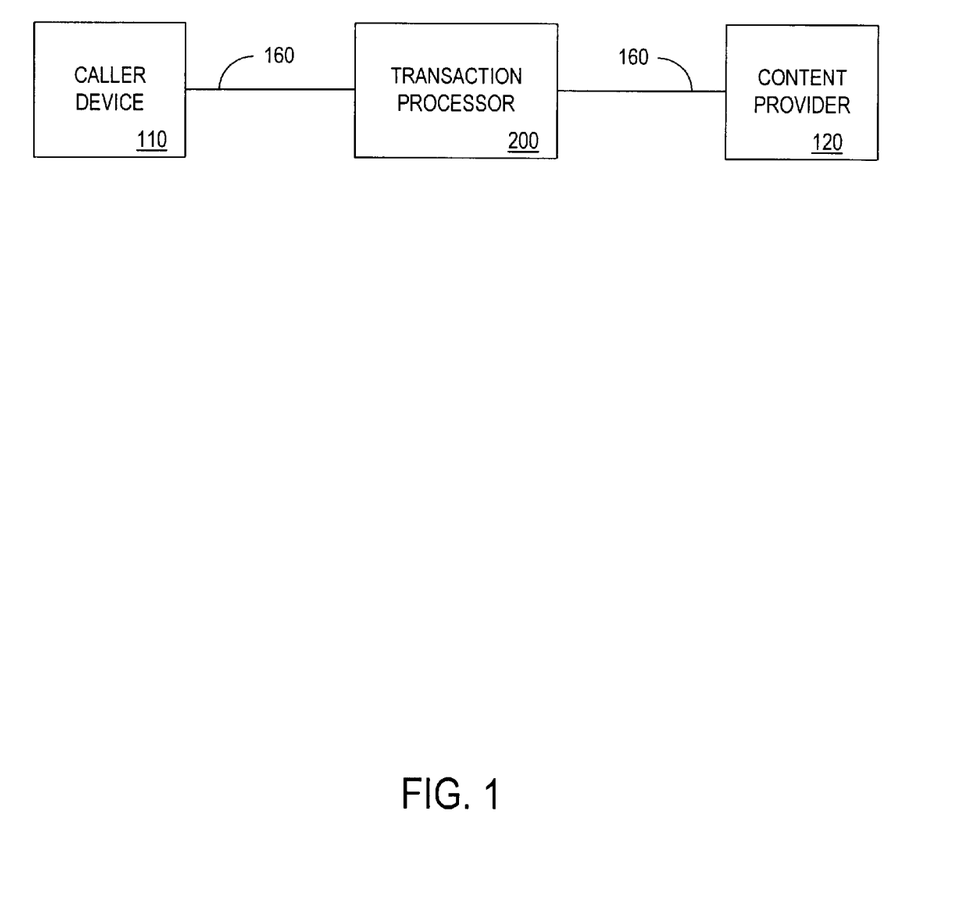
FIG. 1 is a block diagram of a system in accordance with one embodiment of the invention.

FIG. 1 shows a preferred embodiment of a system in accordance with the present invention, which connects a caller device 110 (e.g. a telephone) to a content provider 120 over a telephone network 160 via a transaction processor 200 (e.g., debit card platform).

The content provider 120, as used herein, includes parties which provide information and/or a service over the telephone network 160 and which charge for that service. This includes parties which traditionally have provided services over the telephone network 160 via "900 numbers", "976 numbers" and other shared-revenue numbers. Of course, such services could include the sale of goods, in which case the content would be a catalog of goods offered for sale. Therefore, as used in the present application, the terms "content" and "service" shall be understood to include anything tangible or intangible provided to the caller. Finally, these services, telephone numbers, and content providers may be referred to as shared-revenue services, shared-revenue numbers, and shared-revenue content providers, respectively, in the sense that they charge a premium in addition to the transport costs of the basic telecommunications services, the total access charges typically being shared amongst the content provider, the transaction processor, and the telecommunications service(s).

The telephone network 160, as used herein, includes the combination of local and long distance wire facilities and switches generally known as the public switched telephone network ("PSTN"). However, telephone network 160 is not restricted to the PSTN, but could also include wireless networks, cellular telephone networks, the telephone capability of the Internet, and other non-telephonic communications facilities through which content or services may be provided.

Figure 2:
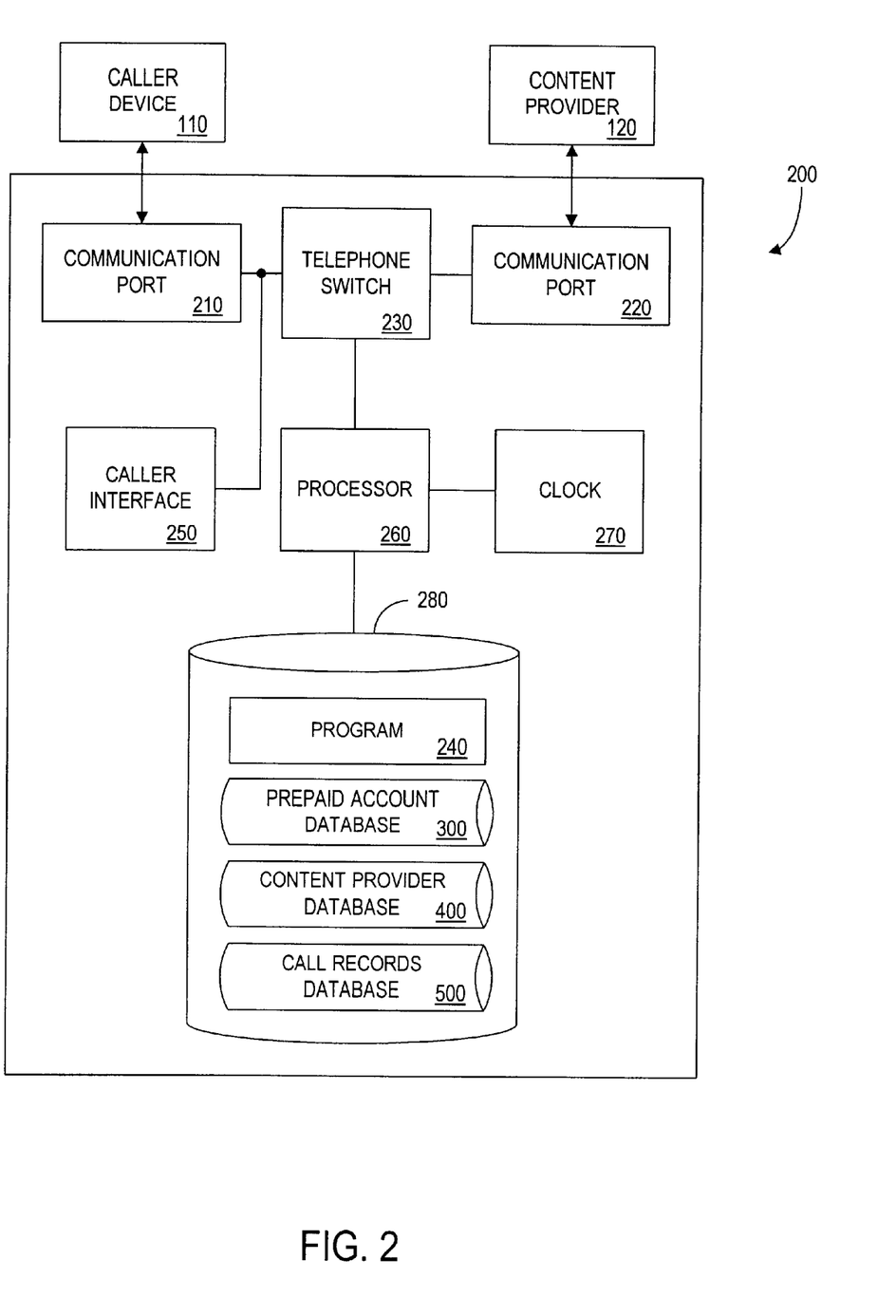
FIG. 2 is a block diagram of the debit card platform of FIG. 1.

FIG. 2 is a block diagram showing the architecture of a preferred embodiment of the transaction processor 200. As the description below will show, the information needed by the caller to use the system can conveniently be derived from a "debit card". The invention is not restricted to use with such debit cards, however the invention should be understood to include any system having the functionality described herein, whether used in conjunction with debit cards or other access devices.

The transaction processor 200 preferably includes certain standard hardware components, such as a processor ("CPU") 260, a clock 270, a telephone switch 230 and a data storage device 280. The processor 260 is preferably linked to each of the other listed elements, either by means of a shared data bus or dedicated connections as shown in FIG. 2.

The transaction processor 200 receives a call from the caller device 110 via a communication port 210. In one embodiment of the invention, the transaction processor 200 is associated with a toll-free telephone number, such as an "800 number" or "888 number" call. The use of toll-free numbers present numerous advantages over other types of telephone calls. For example, current FCC regulations dictate that toll-free numbers cannot be blocked, thus allowing access to the transaction processor 200 and the content provider 120 from any telephone in the United States. The toll-free number is also advantageous for the caller, who can conveniently place the call from any telephone with no record of the call appearing on his regular telephone bill. Although toll-free calls are preferred because of the above advantages, they are not required for the invention. For example, the telephone call could be a collect call, or a direct dialed call paid for by the caller.

The transaction processor 200 establishes a connection to the content provider 120 via a second communications port 220. In one embodiment of the invention, the content providers are shared-revenue content providers that are normally directly accessed via the shared-revenue network, including "900 numbers", "976 numbers" and other similar numbers.

The telephone switch 230 is controlled by a program 240 stored in the data storage device 280. The program 240 directs the processor 200 to connect the caller device 110 and the content provider 120 via their respective connections to the communications ports 210 and 220, respectively.

The communications ports 210 and 220 may include multiple communications channels for simultaneously connecting multiple callers and multiple content providers. In one embodiment of the invention, the communications ports 210 and 220 may be stand-alone devices. Alternatively, the communications ports 210 and 220 may be integrated with a telephone within the telephone switch 230 into a single device.

The telephone switch 230, processor 260, and program 240 may be implemented as separate devices or as a single device. For example, the telephone switch 230 may be a conventional switch such as the Excel LNX 2000 while the program 240 and processor 260 might include an off-the-shelf microprocessor and software. Alternatively, the telephone switch 230 and program 240 both may be implemented through a device such as the AT&T System 8511.

A caller interface 250 includes an interactive voice response unit ("IVRU"). The IVRU facilitates communications between the caller device 110 connected to the 5 communications port 210, and the telephone switch 230 by converting dual tone multi-frequency ("DTMF") signals entered by the caller on his touch tone key pad into digital signals for the telephone switch 230. The IVRU may also transmit various messages selected by the program 240 to the caller device 110.

The data storage device 280 also includes a prepaid account database 300, a content provider database 400 and a call records database 500 (discussed in more detail below with respect to FIGS. 3, 4 and 5, respectively).

Figure 3:
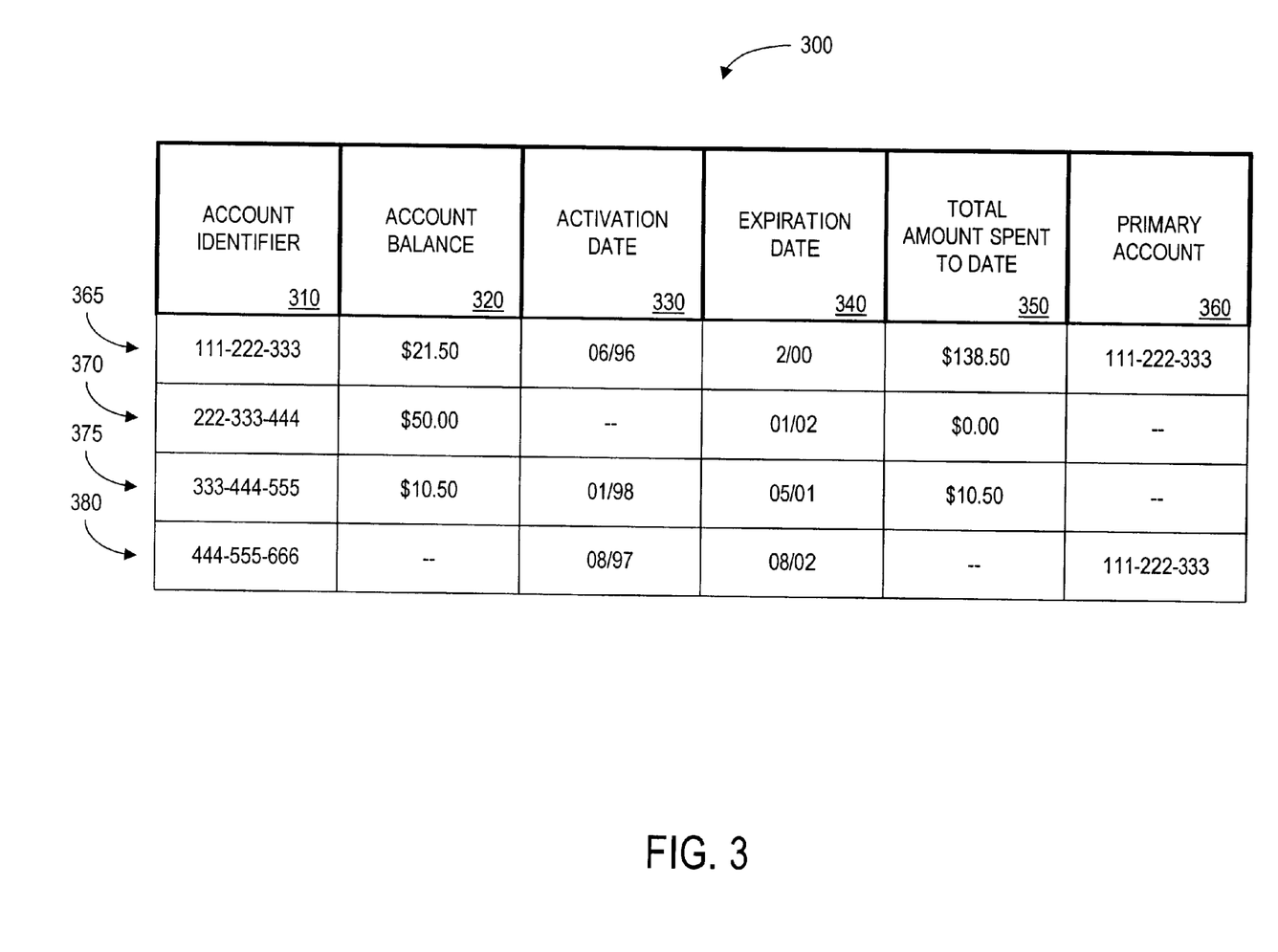
FIG. 3 is a block diagram of the prepaid account database of FIG. 2.
Figure 4:
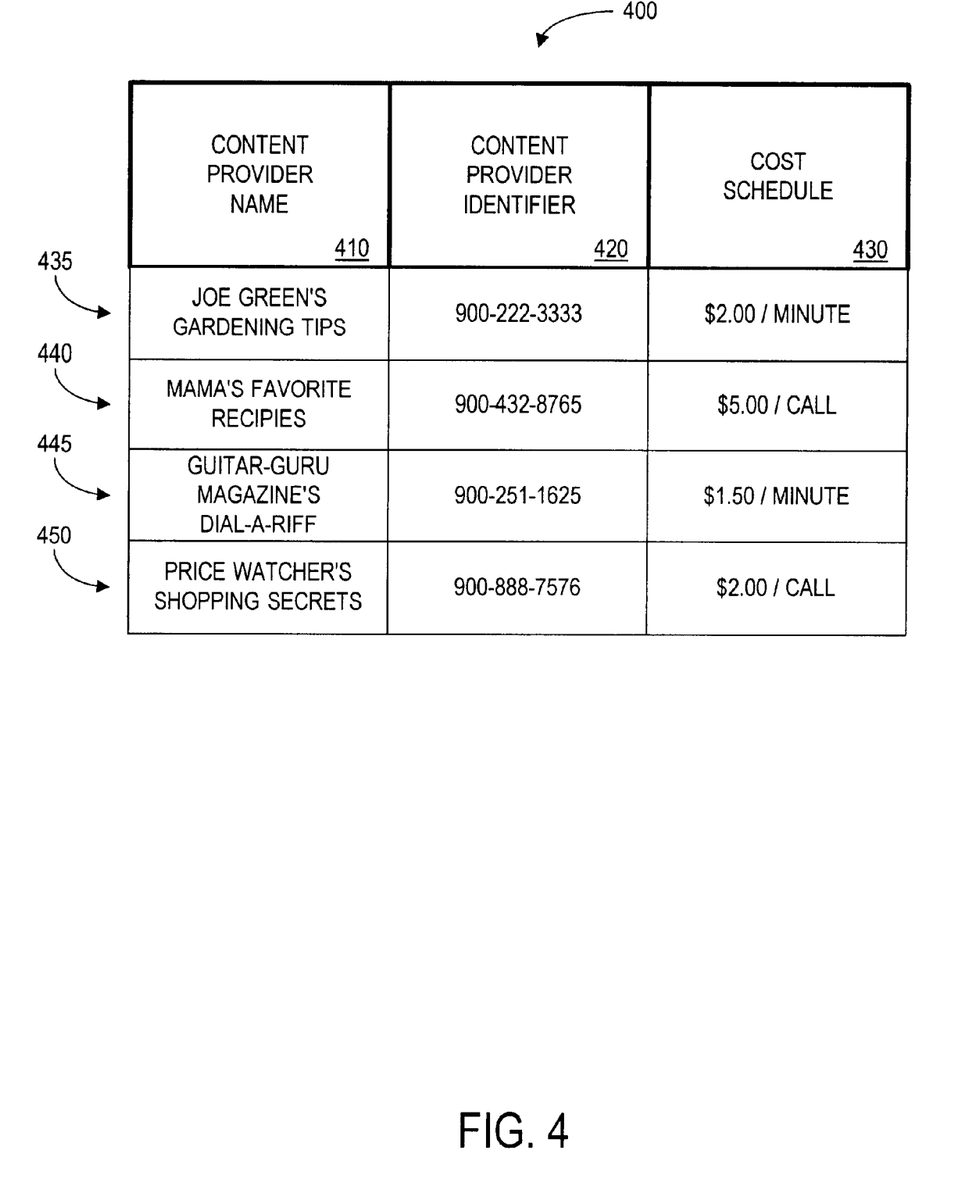
FIG. 4 is a block diagram of the content provider database FIG. 2.

Referring to FIG. 3, the prepaid account database 300 tracks the prepaid accounts of callers. The prepaid account database 300 maintains a plurality of records, such as records 365, 370, 375 and 380, each associated with a different prepaid account identified by an account identifier in field 310. The account may be associated with, for example, a prepaid debit card purchased from an intermediary vendor, or with an account directly established between a caller and the transaction processor 200. In one embodiment, the account identifier 310 is a numeric identification number which may be printed on a prepaid debit card carried by the caller. In another embodiment, account identifier 310 may be automatically generated by transaction processor 200 based on the telephone number from which a call is received. The transaction processor may ascertain the telephone number by an ANI (Automatic Number Identification) signal, as would be apparent to those skilled in the art. The balance, activation date and expiration date of the account are set forth in fields 320, 330 and 340, respectively. Past activity on the account is measured by the total amount of money spent to-date on the account, as set forth in field 350. Finally, the primary account to which the account is linked is set forth in field 360. This allows the transaction processor 200 to automatically begin billing the primary account when the balance of the original account is exhausted, as discussed in more detail below.

In a similar manner, the content provider database 400 tracks content providers. As shown in FIG. 4, the content provider database 400 maintains a plurality of records, such as records 435, 440, 445 and 450, each associated with a different content provider that is identified by content provider name and identifier as set forth in fields 410 and 420, respectively. In the present embodiment of the invention, the content provider identifier is the actual telephone number of the content provider. This allows a caller to connect to the transaction processor 200 via caller device 110 and then identify a content provider by its telephone number. The cost schedule for each content provider is set forth in field 430, and typically has a fixed component and/or a variable component, depending on whether the content provider charges a fixed amount per call (e.g., $5.00/call) or a per quantity charge per call (e.g., $2.00/minute).

Figure 5:
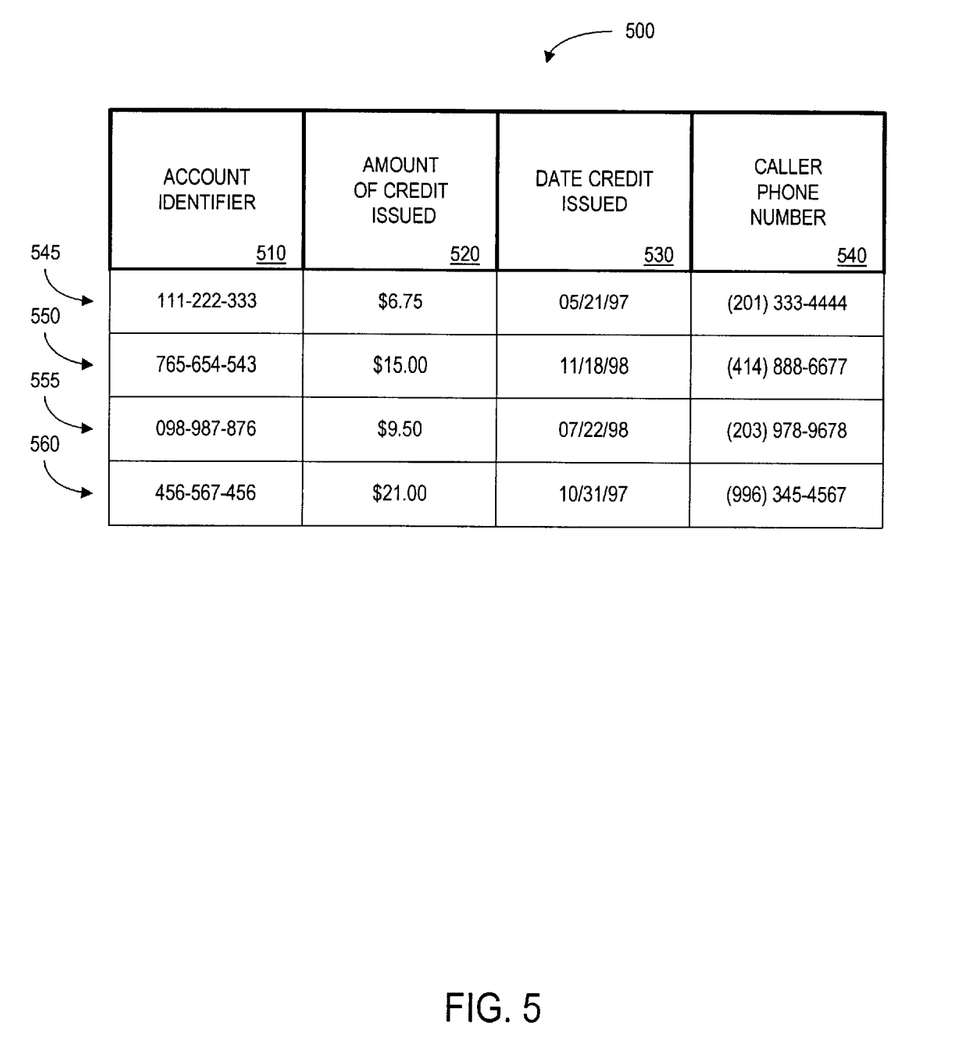
FIG. 5 is a block diagram of the call records database of FIG. 2.

Finally, referring to FIG. 5, the call records database 500 is shown. The call records database 500 maintains a plurality of records, such as records 545, 550, 555 and 560. Each record specifies the amount of credit issued for a particular account identified by the account identifier set forth in field 510. The amount of credit issued to the account and the date the credit was issued (as provided by the clock 270) is set forth in fields 520 and 530, respectively. The telephone number of the caller using the credited account is set forth in field 540.

Method Of Operation

An embodiment of the process for the system described above will now be described in detail by reference to FIGS. 6A–6E.

Figure 6A:
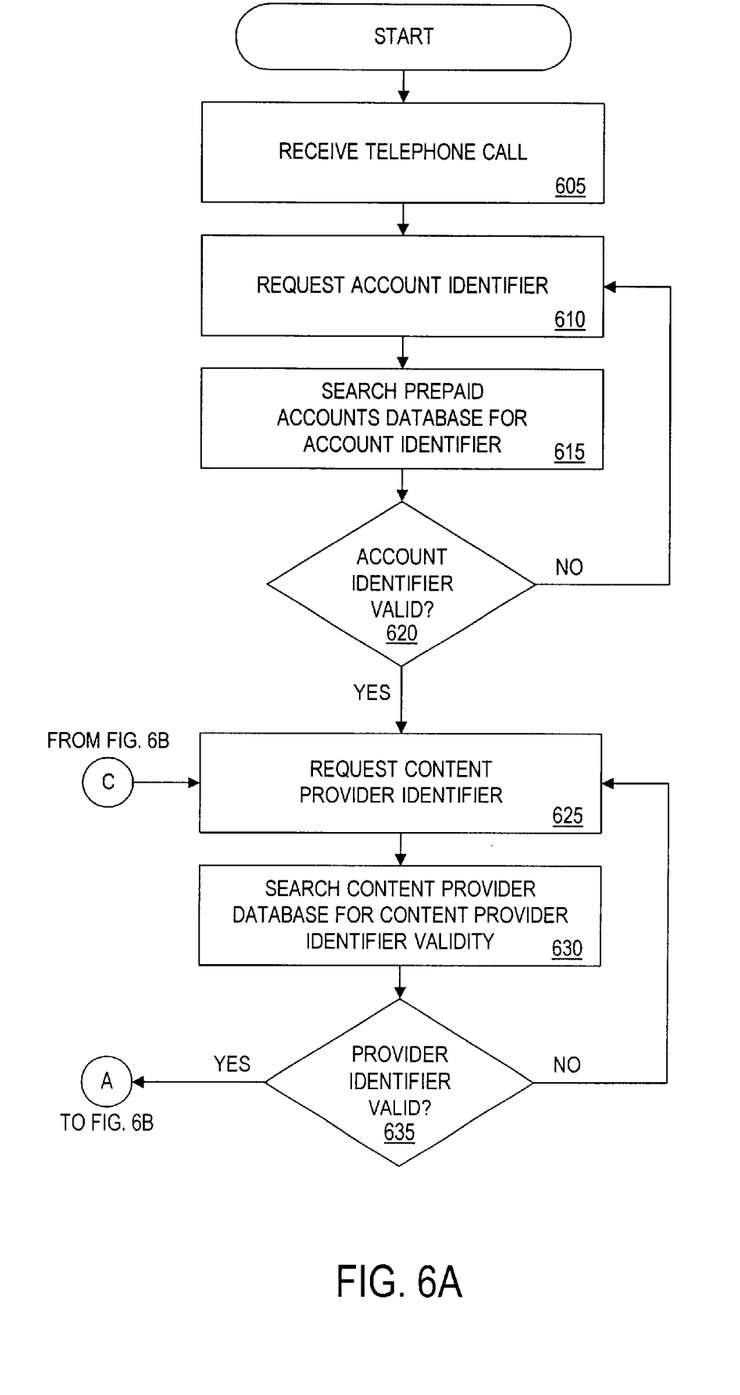
FIGS. 6A–6C are flow diagrams illustrating the operation of the system in accordance with an embodiment of the invention.

Referring to FIG. 6A, the process begins at step 605, where the transaction processor 200 receives a telephone call from the caller device 110. At step 610, the IVRU of the caller interface 250 of the transaction processor 200 requests from the caller an account identifier associated with a prepaid account in the prepaid account database 300. Once the caller device 110 transmits the account identifier (e.g. via DTMF signals that the IVRU converts to digital signals) the program 240 of the transaction processor 200 searches field 310 of the prepaid account database 300 in step 615 for a record corresponding to the received account identifier. In another embodiment, transaction processor 200 derives the caller's account identifier via an automatic number identification (ANI) system. In step 620, the transaction processor 200 makes a determination whether the account identifier is valid, i.e., whether a record containing the received account identifier was located. If the account identifier is invalid (no record was located), the transaction processor repeats steps 610 to 620 until it has received a valid account identifier or until the call is terminated.

Once a valid account identifier has been received from the caller device 110, the transaction processor 200 follows a similar protocol with respect to the request for and receipt of a valid content provider identifier. At step 625, the IVRU of the caller interface 250 requests from the caller a content provider identifier, such as the telephone number of a content provider stored in the content provider database 400. Once the caller device 110 transmits the requested content provider identifier, the program 240 searches field 420 of the content provider database 300 in step 630 for a record corresponding to the received content provider identifier. In step 635, program 240 makes a determination whether the content provider identifier is valid, i.e., whether a record containing the received content provider identifier was located. If the content provider identifier is invalid (no record was located), the transaction processor repeats steps 625 to 635 until it has received a valid content provider identifier or until the call is terminated. In another embodiment, there is a default content provider that a caller is connected to when transaction processor 200 receives a valid account identifier. In yet another embodiment, separate "800 numbers" are maintained by transaction processor 200, each representative of a default content provider.

Figure 6B:
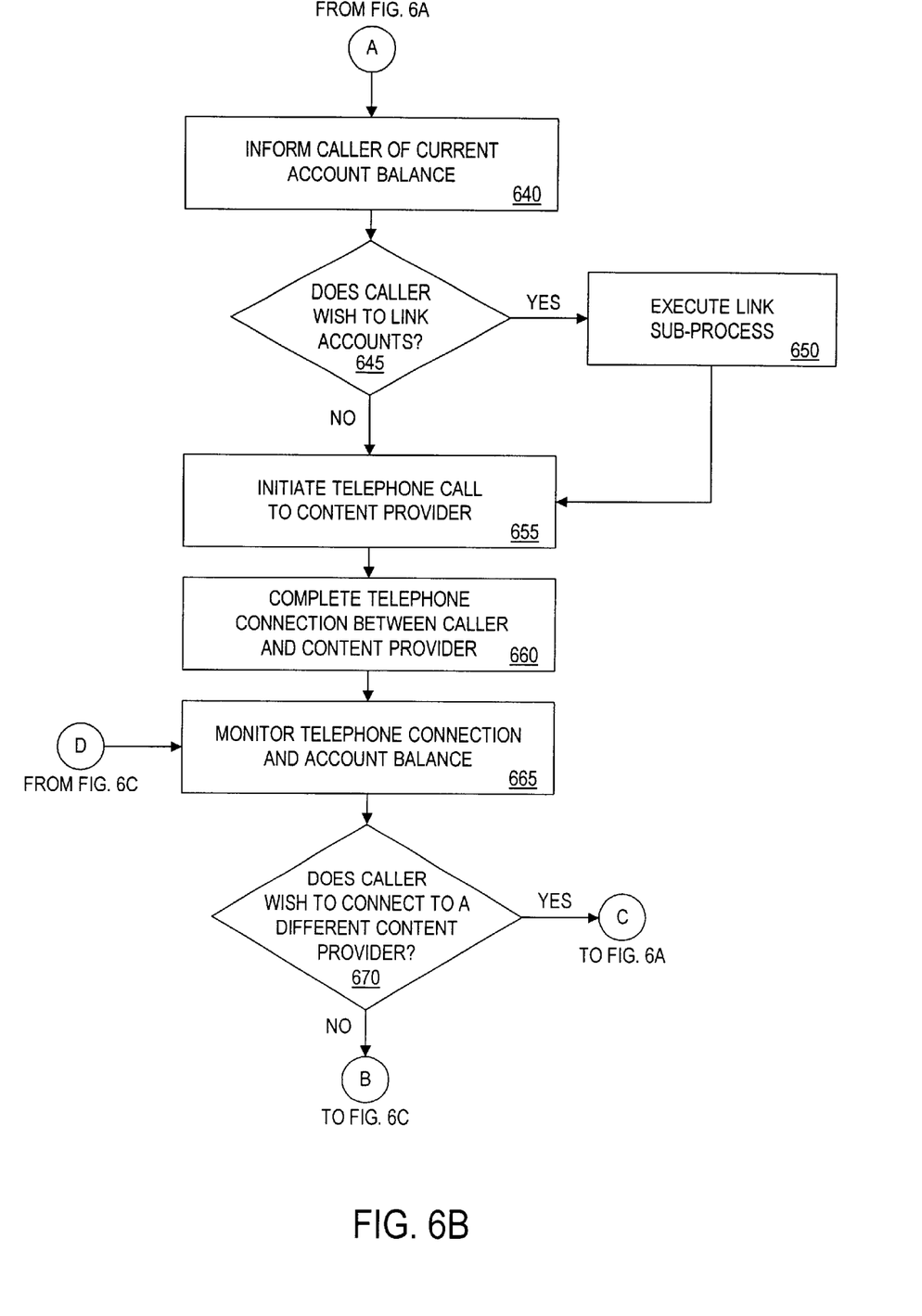

Referring now to FIG. 6B, in step 640 the control logic 240 informs the caller via an IVRU announcement of the current balance of the account. The balance may be ascertained from field 320 of the record of the prepaid account database 300 associated with the account identifier. The caller is then provided with the option to link the account with a second account and, in step 645, if it is determined that the caller does wish to exercise this option, the program 240 performs a link subprocess in step 650. The link subprocess is described in detail by reference to FIG. 6D.

Once the link subprocess is completed, or if the caller did not wish to link accounts, in step 655 the program 240 initiates a telephone call to the content provider 120. At step 660, the program 240 completes the telephone connection from the caller device 110 to the content provider 120 by configuring the telephone switch 230 to connect the telephone call from the caller device 110 to the telephone call made to the content provider 120.

At step 665, the program 240 monitors the telephone connection and the balance of the prepaid account. Using the cost schedule set forth in field 430 of the record associated with the content provider and the duration of the telephone connection, the control logic 240 continuously checks whether the balance remaining in the caller's prepaid account is sufficient to maintain the connection. If during the connection it is determined that the caller wishes to connect to a different content provider (step 670), the process repeats itself at step 625 where the transaction processor 200 requests a content provider identifier from the caller. The caller may indicate that he wishes to return to the content provider menu of the caller interface 250 by inputting a specific keystroke, such as pressing the pound sign (#) during the call.

If it is determined that the caller does not wish to connect to a different content provider, and during the monitoring process the transaction processor 200 determines that the prepaid account has reached a low balance in step 675 (FIG. 6C), the program 240 determines whether there is a linked account in step 680 by reference to the primary account field 360 of the record associated with the original account of the prepaid account database 300. If there is a linked account, in step 685 the transaction processor 200 switches the billing to the linked account listed in the primary account field 360 when the balance of the original account reaches zero. The process then continues at step 665 (FIG. 6B) where the transaction processor 200 continuously monitors the telephone connection and the balance of the account.

Figure 6C:
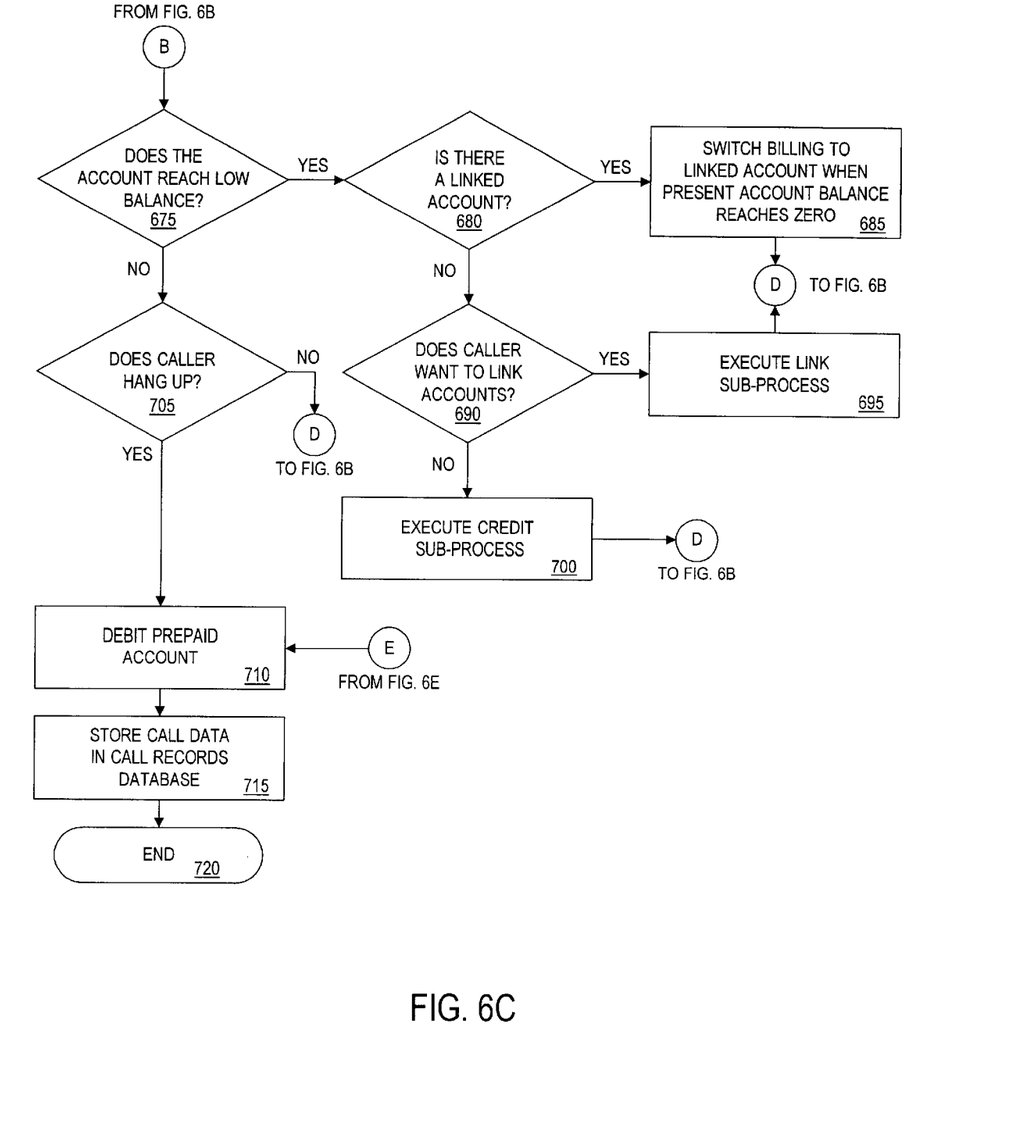

If it is determined in step 680 that there is no linked account, the transaction processor 200 via an IVRU announcement provides the caller with the option of linking his account (step 690) with a new account and, if it is determined that the caller does wish to exercise this option, the program 240 performs the link subprocess of FIG. 6D described below. When the link subprocess is completed, the process then continues from step 665 (FIG. 6B) where the transaction processor 200 continuously monitors the telephone connection and the balance of the account.

If it is determined in step 690 that the caller does not wish to exercise his option of linking accounts, in step 700 the control logic executes a credit subprocess. The credit subprocess is described in detail by reference to FIG. 6E.

If it is determined in step 675 that the account does not reach a low balance, and it is not determined that the caller 110 has hung up in step 705, the connection is maintained and the process repeats itself at step 665. If it is determined in step 705 that the caller has hung up or if it is determined that the caller's account has not been active for the predefined amount of time (step 1105 of the credit subprocess described below), the caller's prepaid account(s) are debited (step 710) according to the amount determined during the monitoring of step 665. The call data is then stored in the call records database 500 in step 715, and the process ends at step 720.

Figure 6D:
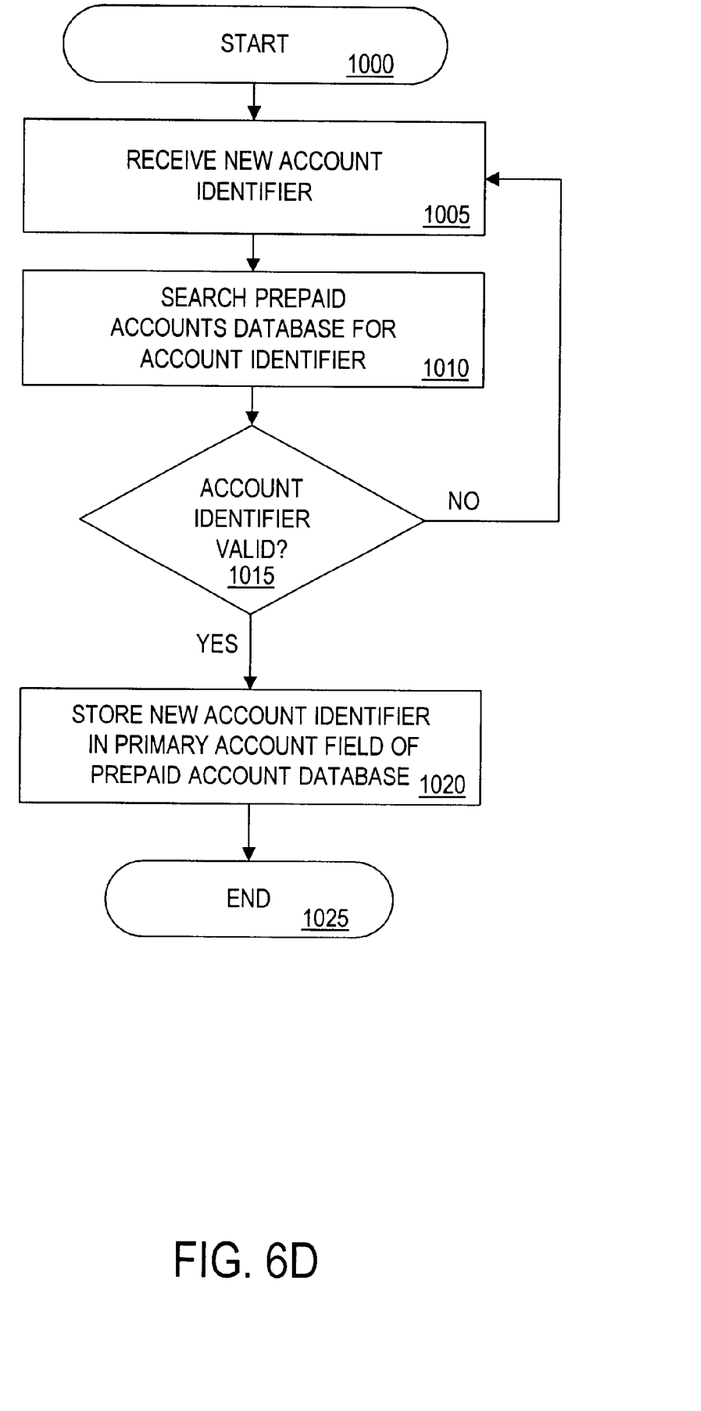
FIG. 6D is a flow diagram illustrating the operation of the link subprocess of FIG. 6C.

Referring to FIG. 6D, the link subprocess begins at step 1000, and in step 1005 the transaction processor 200 receives a new, second account identifier from the caller device 110 in the same manner as described above with respect to receipt of the first account identifier. The program 240 searches field 310 of the prepaid account database 300 in step 1010 for a record corresponding to the new account identifier. In step 1015, the program 240 determines whether the new account identifier is valid, i.e., whether a record containing the received account identifier was located. If the account identifier is invalid (no record was located), the transaction processor repeats steps 1005 to 1015 until it has received a valid new account identifier, or until the call is terminated. Once a valid new account identifier has been received, the new account is "linked" to the original account in step 1020 by the program 240 storing the new account identifier in the primary account field 360 of the record of the prepaid account database 300 associated with the original account. The link subprocess ends in step 1025.

Figure 6E:
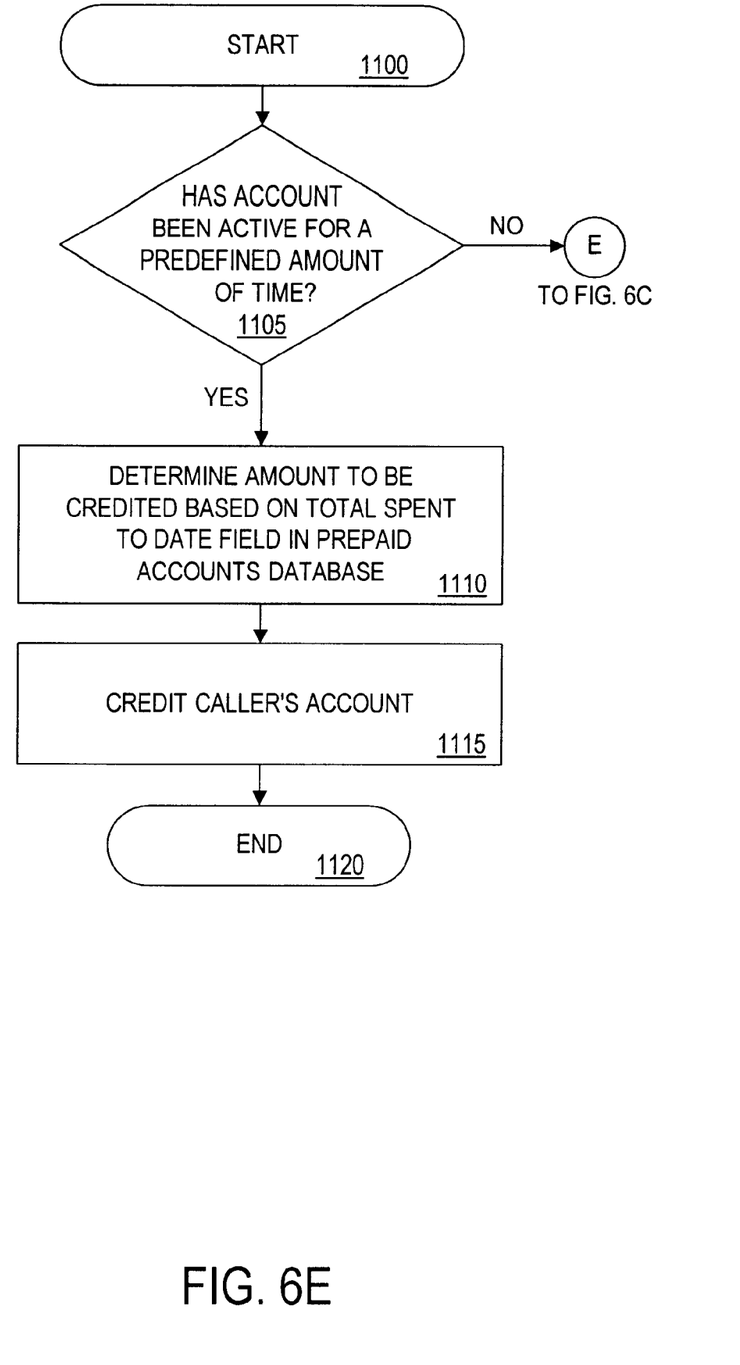
FIG. 6E is a flow diagram illustrating the operation of the credit subprocess of FIG. 6C.

Referring to FIG. 6E, the credit subprocess begins at step 1100, and in step 1105 the program 240 determines whether the account has been active for a predefined amount of time (e.g., one year) by reference to the activation date in field 330 of the record associated with the account in the prepaid account database 300 when compared with the present date as provided by the clock 270. If the account has been active for this predefined period of time, in step 1110 the program 240 determines the amount to be credited to the account based on the amount set forth in field 350 of the record associated with the account in the prepaid account database 330. The amount of credit can be determined, e.g., based on a percentage of the total amount spent, a fixed amount, etc. The transaction processor 200 credits the caller's account by increasing the account balance of field 320 by the appropriate amount of credit in step 1115. The credit subprocess ends in step 1120.

In another embodiment, the IVRU of the transaction processor 200 provides the caller with a listing of content providers amongst which the caller may select. Such listing may also be provided, e.g., in writing on the back of the debit card or on promotional literature.

In another embodiment, the caller device 110 can directly access a desired operator via the transaction processor 200. In this embodiment, the caller device 10 receives from the transaction processor 200 a code representative of a specific operator. If the caller requests the operator and he is unavailable, the caller is prompted to select a different operator, and when the desired operator becomes free, the caller device 110 receives a signal and the caller is asked if he would like to be connected to the previously requested operator. As an example of this embodiment, the caller placed a call to the transaction processor on one occasion and spoke with an operator who knew about the type of gardening the caller was doing, thus compelling the caller to ask that operator for his "direct dial code". A few days later, the caller again calls the transaction processor 200, and when prompted for his requested content provider code, the caller instead inputs the "direct dial code". Unfortunately, the desired operator is busy at the moment, and the caller is prompted to enter a different code. He opts to connect to the general "1-900-GARDENING" number and seeks help from a different operator. When the desired operator is free, the caller is prompted to switch that operator.

In another embodiment, the transaction processor 200 does not require the content provider database 400. The caller device 110 connects to the transaction processor 200 and inputs a code, which is his "900 number" of choice. The transaction processor 200 then calls the content provider 120 on a separate line and determines the associated cost per minute or flat rate. The transaction processor 200 then transfers the caller to the line connected to the content provider 120, and charges his account accordingly. The transaction processor 200 is charged by the content provider 120 as any other caller would be; in fact, the content provider 120 doesn't even need to know that the transaction processor 200 is involved. The caller is then billed by the transaction processor 200 accordingly.

In another embodiment, the caller 110 may call the transaction processor 200 and receive a code representative of and connected to his account. This code is to be used to anonymously pay for content through a content provider 120, perhaps in place of a credit card number. For example, the caller sends a check to the service operating the transaction processor 200, and the caller is in turn provided with a code limited only by the amount of the check that the caller has sent. The code may be the length of a credit card number, thus allowing the caller to anonymously access any content provider in a manner similar to when he pays using a credit card number.

In yet another embodiment, a different code could also be used that corresponds to a non-listed phone number that provides the caller with content similar to that of a standard content provider. This code is a "back-door" phone number that provides the caller with free access to the content provider 120. However, the non-listed phone number is not listed anywhere and must be given to the caller by the content provider 120. To avoid unauthorized callers from unduly exploiting the unlisted number, the number could change on a periodic basis, such as day-to-day or week-to-week. The caller would be charged a flat rate for the "secret number" with, e.g., a free week of content. This allows the caller to simply call the number without having to input any account or related information. The content provider 120 could also be configured to provide the caller with a callback upon request.

Although in some embodiments methods are disclosed for allowing the caller to increase the balance of his account is by linking a second account or by obtaining credit, alternate embodiments allow payment using E-cash, any pre-paid medium (phone card, traditional or electronic gift certificates, "900#" card, mail-in money order) or cash inserted into a pay phone.

Finally, other embodiments of the events which "trigger" the caller to increase the balance of his account include: (1) when the caller initially connects to the transaction processor 200; (2) when the transaction processor 200 outputs the cost of the service offered by the content provider 120; (3) when the caller's account balance is not sufficient to pay for a product or flat rate content; (4) when a projected call time or call cost exceeds the amount of credit in the caller's account; or (5) upon expiration of a predetermined period of time.

Although the present invention has been described in terms of particular embodiments, it will be appreciated that various modifications and alterations thereto may be made without departing from the spirit and scope of the invention. Therefore, it is intended that the scope of the invention be limited by only the following claims.

We claim:

1. A method for allowing a caller to access a service offered by a content provider, comprising:
   receiving a telephone call from the caller identifying (a) a first account identifier corresponding to a balance of a first account, the balance of the first account being associated with an amount of available funds, and (b) a content provider identifier corresponding to a telephone number of the content provider;
   establishing a telephone connection between the caller and the content provider to enable the content provider to provide an unlisted telephone number to the caller through the telephone connection; and
   debiting the first account by a transaction amount based on the content provider and the service provided;
   wherein the caller independently accesses the unlisted telephone number of the content provider.

2. A method for allowing a caller to access a service offered by a content provider, comprising:
   receiving a telephone call from the caller identifying (a) a first account identifier corresponding to a balance of a first account, the balance of the first account being associated with an amount of available funds, and (b) a content provider identifier corresponding to a telephone number of the content provider;
   establishing a telephone connection between the caller and the content provider to enable the content provider to provide a service to the caller through the telephone connection;
   monitoring the telephone connection and the amount of available hinds;
   performing an action to increase the amount of available finds;
   debiting the first account by a transaction amount based on the content provider and the service provided;
   receiving a second account identifier corresponding to a balance of a second account; and
   storing the second account identifier in association with the first account, thereby linking the second account with the first account,
   wherein performing the action to increase the amount of available funds comprises:
      determining, based on a cost of the service and a duration of the telephone connection, when the balance of the first account is less than a threshold value, and
      increasing the amount of available finds by transferring funds from the second account if the balance of the first account decreases to below the threshold value.

3. A method for allowing a caller to access a service offered by a content provider, comprising:
   receiving a telephone call from the caller identified (a) a first account identifier corresponding to a balance of a first account, the balance of the first account being associated with an amount of available funds, and (b) a content provider identifier corresponding to a telephone number of the content provider;
   establishing a telephone connection between the caller and the content provider to enable the content provider to provide a service to the caller through the telephone connection;

monitoring the telephone connection and the amount of available funds;

performing an action to increase the amount of available funds;

debiting the first account by a transaction amount based on the content provider and the service provided;

receiving a second account identifier corresponding to a balance of a second account; and storing the second account identifier in association with the first account, thereby linking the second account with the first account, wherein performing the action to increase the amount of available funds comprises debiting the second account when the balance of the first account is less than a threshold value.

4. A method for allowing a caller to access a service offered by a content provider, comprising:

receiving a telephone call from the caller identifying (a) a first account identifier corresponding to a balance of a first account, the balance of the first account being associated with an amount of available funds, and (b) a content provider identifier corresponding to a telephone number of the content provider;

establishing a telephone connection between the caller and the content provider to enable the content provider to provide a service to the caller through the telephone connection;

monitoring the telephone connection and the amount of available funds;

automatically performing an action to increase the amount of available funds;

debiting the first account by a transaction amount based on the content provider and the service provided;

receiving from the caller a second content provider identifier corresponding to a telephone number of a second content provider; and establishing a telephone connection between the caller and the second content provider to enable the second content provider to provide a second service to the caller through the telephone connection.

5. A method for allowing a caller to access a service offered by a content provider, comprising:

receiving a telephone call from the caller identifying (a) a first account identifier corresponding to a balance of a first account, the balance of the first account being associated with an amount of available funds, and (b) a content provider identifier corresponding to a telephone number of the content provider;

establishing a telephone connection between the caller and the content provider to enable the content provider to provide a service to the caller though the telephone connection;

monitoring the telephone connection and the amount of available funds;

performing an action to increase the amount of available funds; and debiting the first account by a transaction amount based on the content provider and the service provided, wherein performing the action to increase the amount of available funds comprises;

determining, based on a cost of the service and a duration of the telephone connection, when the balance of the first account is less than a threshold value, and automatically increasing the amount of available funds by a predetermined amount if the balance of the first account falls below the threshold value.

6. A method for allowing a caller to access a service offered by a content provider, comprising:

receiving a telephone call from the caller identifying (a) a first account identifier corresponding to a balance of a first account, the balance of the first account being associated with an amount of available funds, and (b) a content provider identifier corresponding to a telephone number of the content provider;

establishing a telephone connection between the caller and the content provider to enable the content provider to provide a service to the caller through the telephone connection;

monitoring the telephone connection and the amount of available funds;

automatically increasing the amount of available funds based on a triggering event, wherein the triggering event is the receipt of the telephone call; and debiting the first account by a transaction amount based on the content provider and the service provided.

7. A method for allowing a caller to access a service offered by a content provider, comprising:

receiving a telephone call from the caller identifying (a) a first account identifier corresponding to a balance of a first account, the balance of the first account being associated with an amount of available funds, and (b) a content provider identifier corresponding to a telephone number of the content provider;

establishing a telephone connection between the caller and the content provider to enable the content provider to provide a service to the caller through the telephone connection;

monitoring the telephone connection and the amount of available funds;

automatically increasing the amount of available funds based on a triggering event;

debiting the first account by a transaction amount based on the content provider and the service provided; and informing the caller of a cost of the service, the informing being the triggering event.

8. A method for allowing a caller to access a service offered by a content provider, comprising:

receiving a telephone call from the caller identifying (a) a first account identifier corresponding to a balance of a first account, the balance of the first account being associated with an amount of available funds, and (b) a content provider identifier corresponding to a telephone number of the content provider;

establishing a telephone connection between the caller and the content provider to enable the content provider to provide a service to the caller through the telephone connection;

monitoring the telephone connection and the amount of available funds;

automatically increasing the amount of available funds based on a triggering event;

debiting the first account by a transaction amount based on the content provider and the service provided; and determining whether the amount of available funds is sufficient to pay for the service, wherein the triggering event is an insufficiency of available funds.

9. A method for allowing a caller to access a service offered by a content provider, comprising:

receiving a telephone call from the caller identifying (a) a first account identifier corresponding to a balance of a first account, the balance of the first account being associated with an amount of available funds, and (b) a content provider identifier corresponding to a telephone number of the content provider;

establishing a telephone connection between the caller and the content provider to enable the content provider to provide a service to the caller through the telephone connection;

monitoring the telephone connection and the amount of available funds;

automatically increasing the amount of available funds based on a triggering event, wherein the triggering event is an expiration of a period of time; and debiting the first account by a transaction amount based on the content provider and the service provided.

10. A method for allowing a caller to access a service offered by a content provider, comprising:

receiving a telephone call from the caller identifying (a) a first account identifier corresponding to a balance of a first account, the balance of the first account being associated with an amount of available funds, and (b) a content provider identifier corresponding to a telephone number of the content provider;

establishing a telephone connection between the caller and the content provider to enable the content provider to provide a service to the caller through the telephone connection;

monitoring the telephone connection and the amount of available funds;

automatically increasing the amount of available funds;

debiting the first account by a transaction amount based on the content provider and the service provided; and providing the caller an operator identifier corresponding to a specific operator.

11. The method according to claim 10, further comprising:

receiving the operator identifier from the caller; and connecting the caller to the specific operator corresponding to the operator identifier.

12. A method comprising:

receiving a first account identifier that identifies a first account, in which the first account has a first balance;

receiving a content identifier that identifies content;

determining a cost schedule, in which the cost schedule is based on the content;

establishing a connection, in which the connection enables a caller to receive the content;

determining a second balance of the first account based on the cost schedule;

determining whether the second balance is less than a predetermined amount; and automatically increasing the second balance if the second balance is less than the predetermined amount, thereby determining a third balance of the first account.

13. The method of claim 12, in which establishing a connection comprises:

establishing a connection between the caller and a provider of the content.

14. A method comprising:

receiving a first account identifier that identifies a first account, in which the first account corresponds to an amount of available funds;

receiving a content identifier that identifies content;

determining a cost schedule, in which the cost schedule is based on the content;

establishing a connection, in which the connection enables a caller to receive the content;

debiting the first account based on the cost schedule;

determining whether the amount of available funds is less than a predetermined amount; and automatically increasing the amount of available funds if the amount of available funds is less than the predetermined amount.

15. The method of claim 14, in which establishing a connection comprises:

establishing a connection between the caller, and a provider of the content.

16. The method of claim 14, in which the amount of available funds comprises a balance of the first account.

17. The method of claim 12, further comprising:

receiving a second account identifier corresponding to a second account; and linking the second account with the first account.

18. The method of claim 17, in which automatically detecting comprises:

transferring an amount of funds from the second account to the first account.

19. The method of claim 12, in which automatically determining comprises:

determining whether the caller is eligible for credit;

determining an amount of credit if the caller is eligible for credit; and determining the third balance based on the amount of credit.

20. The method of claim 19, in which determining whether the caller is eligible for credit comprises:

determining whether the first account has been active for a predetermined time period.

21. The method of claim 19, in which determining the amount of credit comprises:

determining the amount of credit based on a total amount the caller has spent on the content.

22. The method of claim 12, in which the first account is associated with a debit card.

23. The method of claim 12, in which the second account is associated with a debit card.

24. The method of claim 12, in which the cost schedule is a fixed amount per call.

25. The method of claim 12, in which the cost schedule is an amount per a period of time.

26. The method of claim 14, further comprising:

receiving a second account identifier corresponding to a second account; and linking the second account with the first account.

27. The method of claim 26, in which automatically increasing comprises:

transferring all amount of funds from the second account to the first account.

28. The method of claim 14, in which automatically increasing comprises:

determining whether the caller is eligible for credit;

determining an amount of credit if the caller is eligible for credit; and increasing the amount of available flint's based on the amount of credit.

29. The method of claim 28, in which determining whether the caller is eligible for credit comprises:

determining whether the first account has been active for a predetermined time period.

30. The method of claim 28, in which determining the amount of credit comprises determining the amount of credit based on a total amount the caller has spent on the content.

31. The method of claim 14, in which the first account is associated with a debit card.

32. The method of claim 14, in which the second account is associated with a debit card.

33. The method of claim 14, in which the cost schedule is a fixed amount per call.

34. The method of claim 14, in which the cost schedule is an amount per a period of time.

* * * * *